United States Patent
Johnston

[15] 3,655,911
[45] Apr. 11, 1972

[54] AUTOMATIC STEREOPLOTTING SYSTEM

[72] Inventor: Howard Ronald Johnston, Lexington, Mass.

[73] Assignee: Itek Corporation, Lexington, Mass.

[22] Filed: Dec. 22, 1969

[21] Appl. No.: 887,157

[52] U.S. Cl. .................. 178/6.8, 178/DIG. 1, 178/DIG. 20
[51] Int. Cl. ........................................................ H04n 7/02
[58] Field of Search .................. 178/6, 6 T, 6.5, 6.8, 7.28; 250/220, 202, 217; 356/2

[56] References Cited

UNITED STATES PATENTS

| | | | |
|---|---|---|---|
| 2,250,479 | 7/1941 | Goldmark | 178/7.2 C |
| 3,432,674 | 3/1969 | Hobrough | 250/220 SP |
| 3,473,875 | 10/1969 | Bertrarn | 250/220 SP |
| 3,518,726 | 6/1970 | Johns | 178/DIG. 4 |

*Primary Examiner*—Robert L. Griffin
*Assistant Examiner*—Barry Leibowitz
*Attorney*—Homer O. Blair and Robert L. Nathans

[57] ABSTRACT

Disclosed in an automatic stereoplotting system utilizing a registration error signal responsive servomechanism to correct parallax and indicate elevation of actual terrain imaged at certain points in a pair of stereo photographs. The inherent steady state following error of the servomechanism is compensated to provide an elevation indicating output that corresponds in time with output signals identifying the relative positions of the image points being considered.

21 Claims, 5 Drawing Figures

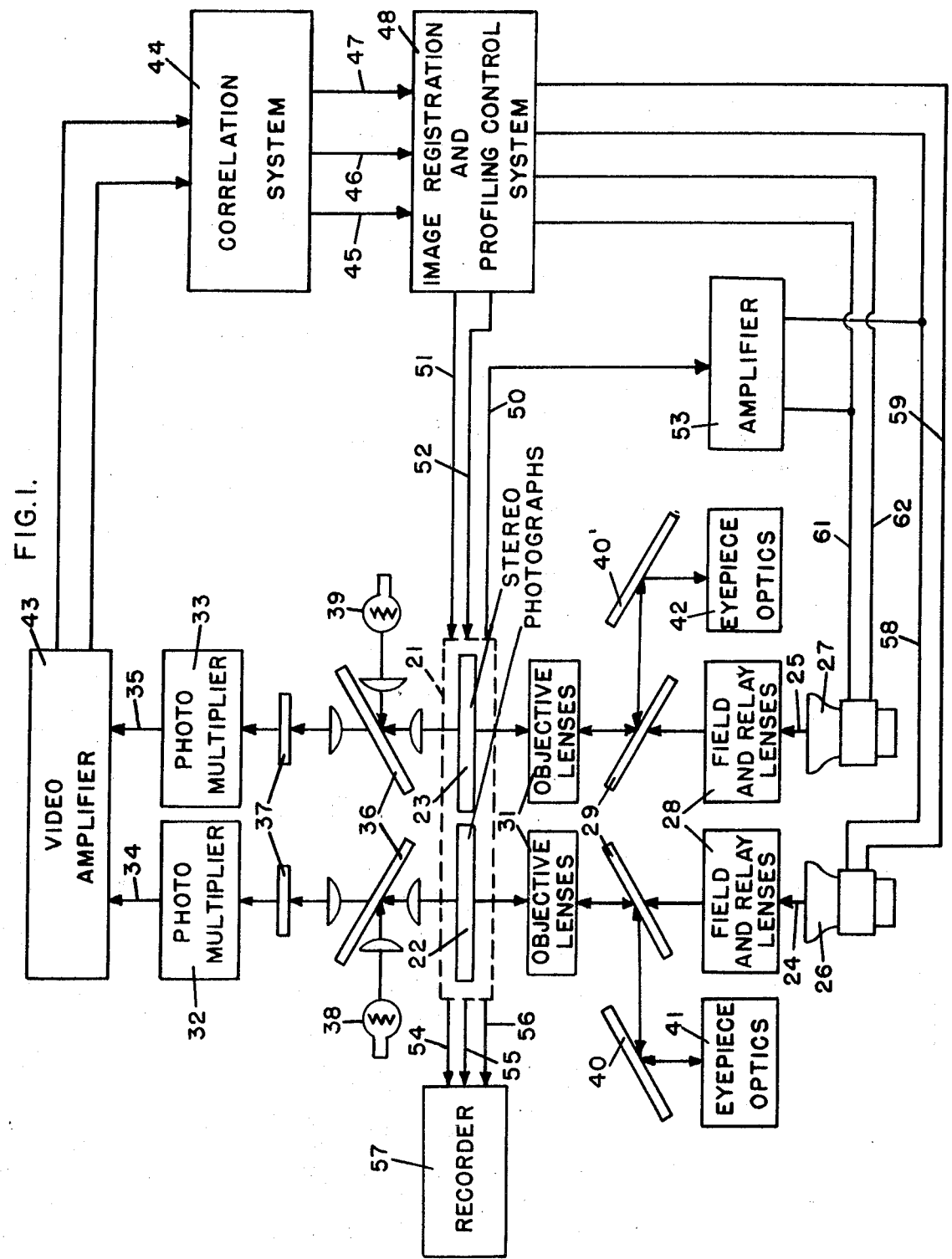

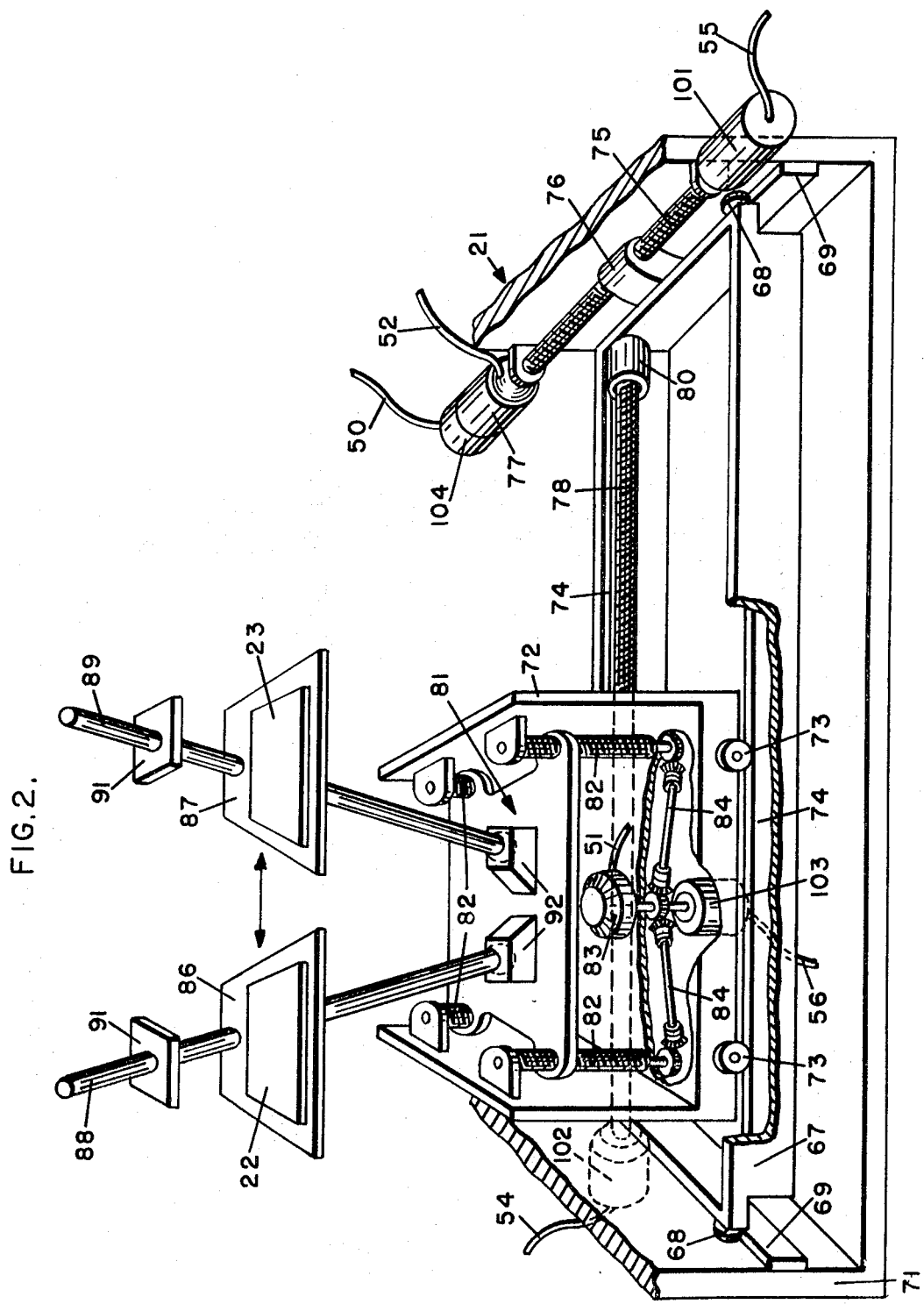

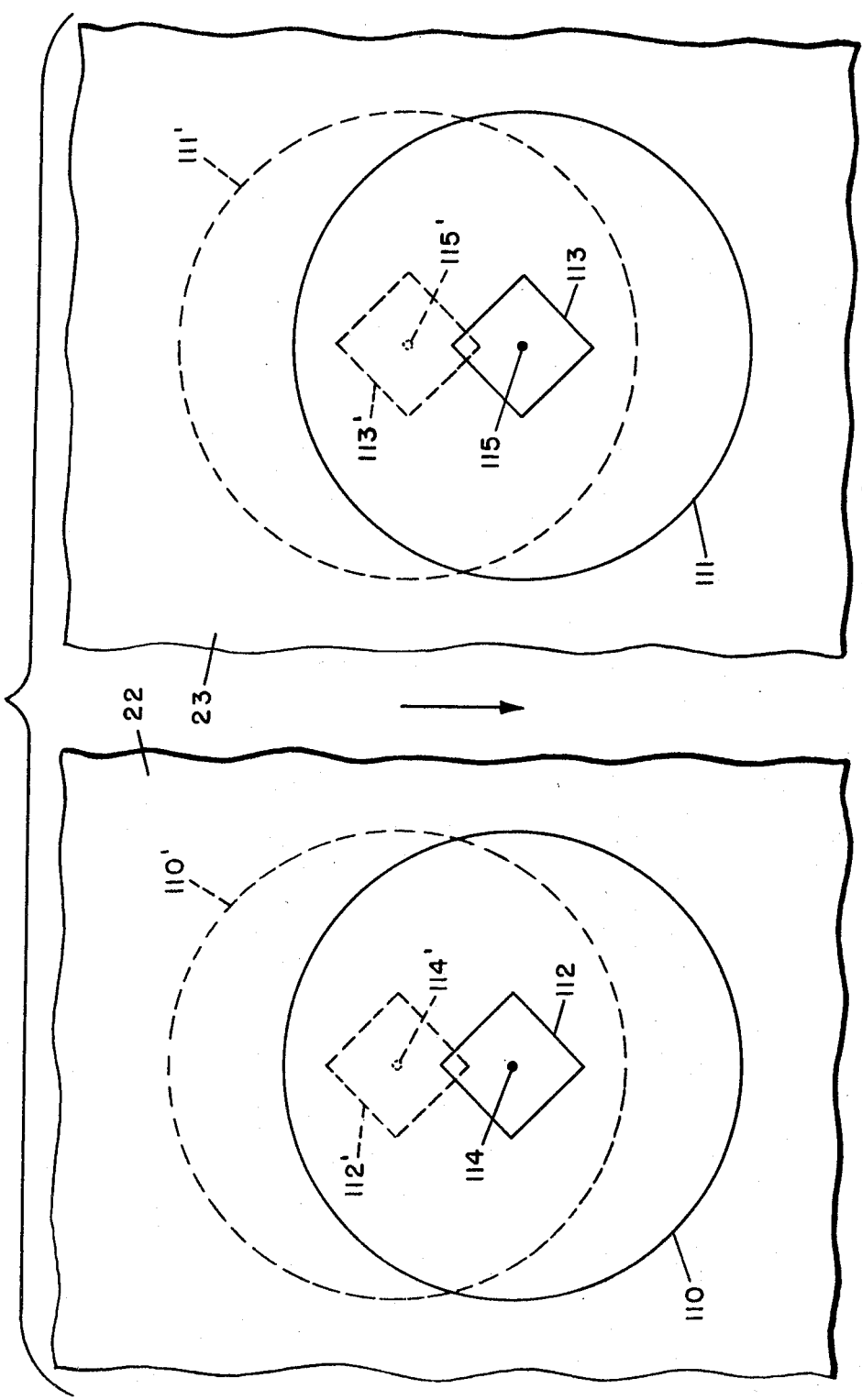

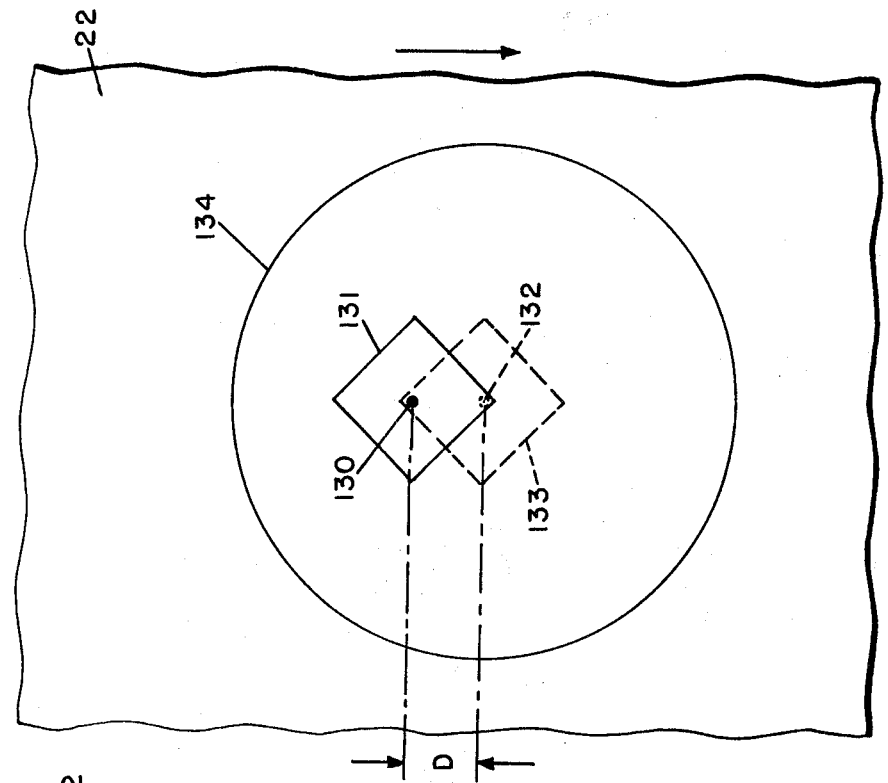
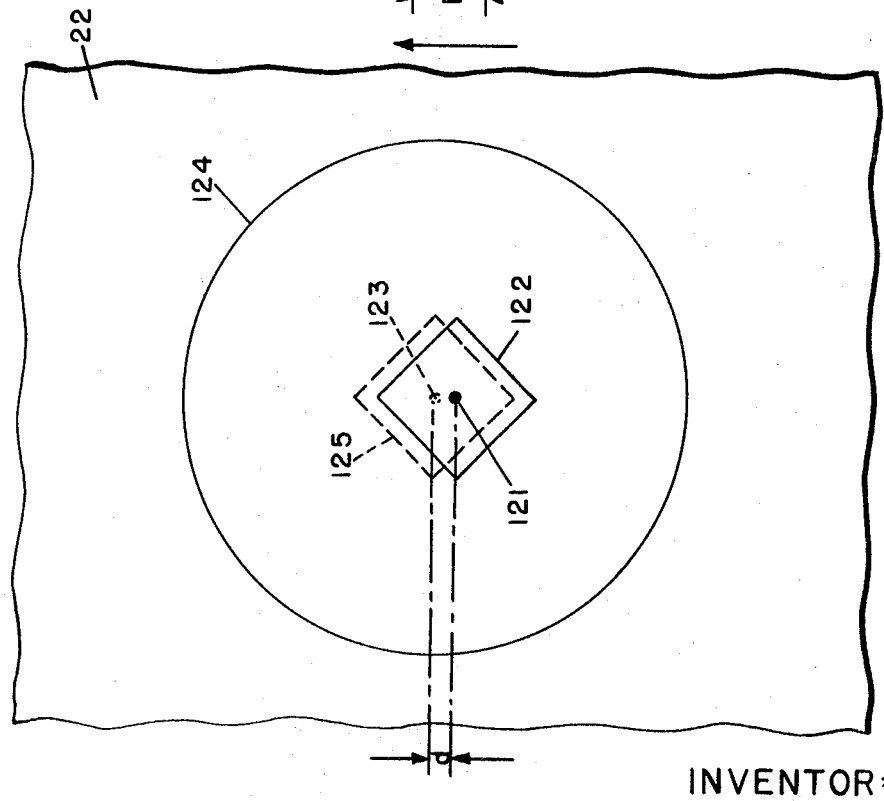

AUTOMATIC STEREOPLOTTING SYSTEM

BACKGROUND OF THE INVENTION

This invention relates generally to dual image registration systems and, more specifically, to an automatic stereoplotting instrument for use in the production of topographic maps.

According to well-known techniques in the field of photogrammetry, stereo perception is employed to obtain elevation and position measurements of terrain imaged on a pair of stereographic photographs. The stereo photographs are positioned in a stereoplotting machine that produces for an operator a stereographic presentation of a particular area of the terrain imaged on the photographs. By inducing appropriate relative displacement of the photographs in a direction corresponding to the direction of separation between the positions from which the photographs were taken, the operator registers image detail and eliminates zero order distortion in the stereo presentation. The magnitude of displacement required to eliminate the distortion, commonly called parallax, is proportional to the relative elevation of the actual terrain imaged on the viewed area of the photographs and is automatically recorded by the stereoplotting machine. Simultaneously recorded for the viewed area is its position in the photographs which identifies the relative position of the actual terrain. Thus, by continuously maintaining registration of the individually viewed image areas, while systematically traversing the entire surface of the two photographs, relative elevation and position information is obtained for all the terrain imaged on the photographs.

Typically, the systematic traversal is accomplished by moving the photographs on an x-y carriage relative to the optical viewing system. While controlling movement of the x-y carriage, the operator continuously adjusts the horizontal displacement between the photographs so as to maintain image registration. Generally the operator is guided during the procedure by the well-known "floating mark." This mark comprises some indicia such as light spots located at the optical axes of the stereo viewing system and when fused into a single spot in the stereo presentation appears to lie on the surface of the stereo terrain model only when the images are properly registered.

Even with the most modern instruments, manual stereoplotting is a tedious and time consuming operation. The time required to manually profile a typical stereo model is between 2 and 4 hours, depending on the roughness of the terrain. When functioning to adjust the apparent height of the floating mark by means of a hand or foot wheel, a human operator becomes part of a closed loop feedback system and is subject to some basic limitations. For example, his response, i.e., the time delay between the perception of an error in the height of the floating mark and its subsequent correction by means of the hand wheel, has a definite minimum value making it necessary to reduce traversing speed in rough terrain.

A number of automatic stereoplotting systems have been developed for simplifying the dual image registration procedure. Basically, most such systems scan homologous sections of the two photographs and convert the scanned graphic data into a pair of electrical video signals. By various correlation and analyzation techniques, the video signals are used to produce error signals representing certain types of distortion existing between the scanned image sections. The scanned sections are then rendered congruent by image detail transformations produced in response to the derived error signals. Usually, the x-parallax error signal indicative of terrain elevation is applied to a servomechanism that corrects zero order distortion by producing appropriate relative movement between the stereo photographs or height adjustments of a viewing surface that intercepts a projection of the images. As noted above, the magnitude of required x-parallax correction is directly related to the relative elevation of the actual terrain and provides the contour information necessary for topographic maps.

The electro-mechanical servomechanisms utilized in automatic stereoplotting instruments, given suitable input, can respond more quickly than a human operator and consequently can substantially reduce the time required to profile a stereo model particularly one involving rapid fluctuations of terrain height. The same servomechanisms, however, also introduce errors in the output information. Because of its inherent steady state following error some finite time period is required by the servomechanism to effect corrective relative image displacements in response to an x-parallax error signal derived from discrete scanned sections of the two photographs. The particular image sections being scanned, however, are continuously changed by traversing movement of the x-y carriage retaining the photographs. Thus the elevation indicated by the instantaneous position of the servomechanism does not correspond identically to the x-y coordinate position of the image sections being scanned. Rather, the instantaneous position of the servomechanism represents the elevation of image sections scanned a finite period earlier. Because of this discrepancy the elevation and position information outputs continuously recorded by the automatic stereoplotting instrument do not exactly correspond. For this reason also, the floating mark does not accurately follow the surface of the stereo model and an operator cannot accurately monitor performance of the instrument.

The object of the invention, therefore, is to provide an improved automatic stereoplotting instrument that eliminates the problems noted above.

CHARACTERIZATION OF THE INVENTION

The invention is characterized by the provision of an automatic stereoplotting system including a stereographic viewer for providing a stereographic display of corresponding areas in a pair of stereographic photographs mounted on a x-y carriage. A pair of cathode ray tubes produces scanning beams which are directed through and modulated by image detail retained in distinct sections of the stereographic photographs. Drive motors selectively move the carriage in orthogonally related directions so as to change simultaneously and uniformly the corresponding areas being viewed and the corresponding sections being scanned by the scanning beams. Image detail information extracted by the scanning beams is converted into electrical analog signals by suitable photo detectors. These analog signals are correlated and analyzed according to conventional techniques producing an x-parallax error signal indicative of x-parallax existing between the image sections being scanned. The x-parallax error signal is applied to a servomechanism that produces relative movement between the stereographic photographs in a sense required to effect registration of the homologous image detail therein. To compensate for the inherent steady state following error of the servomechanism a variable position controller maintains the discrete sections being scanned displaced ahead of the corresponding areas being viewed in the direction in which the x-y carriage is moving. Thus, the servomechanism responds to image detail information extracted from image sections some distance ahead of the image areas being viewed and located by position indicators. By establishing an appropriate displacement between the centers of the image sections being scanned and the image areas being viewed, the servomechanism instantaneously produces a corrective relative image transformation corresponding to an x-parallax error signal value derived from previously scanned image sections coincident with the image areas being simultaneously viewed and located. Thus, the above described inaccuracies are eliminated.

According to one feature of the invention, the displacement between the image sections scanned and the image areas viewed is obtained by applying a position control signal to one of the deflection coils in each of the cathode ray tubes. The effect of the position control signal is to deflect the scanning patterns generated by the cathode ray tubes in a direction determined by the polarity of the applied signal and to a degree determined by its value. This arrangement provides in a simple manner the desired variable control of the displacement between the image areas being viewed and the image sections being scanned.

According to another feature of the invention, the position control signal is made dependent upon the relative velocity produced by the driven x-y carriage. Application of the signal to the cathode ray tube's deflection coils effects scanning pattern displacement of an amount proportional to the velocity of carriage movement. In this way, appropriate displacement between the corresponding sections scanned and the corresponding areas viewed is provided in applications involving variable carriage speed.

DESCRIPTION OF THE DRAWINGS

These and other objects and features of the invention will become more apparent upon a perusal of the following description taken in conjunction with the accompanying drawings wherein:

FIG. 1 is a general block diagram illustrating the functional relationship of the main components of the apparatus;

FIG. 2 is a perspective schematic view of the image transformation mechanism 21 shown in FIG. 1;

FIG. 3 is a schematic representation illustrating operation of the invention under one set of conditions;

FIG. 4 is a schematic representation illustrating operation of the invention under a different set of conditions; and FIG. 5 is a schematic representation illustrating operation of the invention under still another set of conditions.

DESCRIPTION OF THE PREFERRED EMBODIMENT

Referring now to FIG. 1 there is shown in block diagram form an image transformation mechanism 21 retaining a pair of stereo photographic transparencies 22 and 23. Scanning beams 24 and 25 for extracting image detail information from the transparencies 22 and 23 are produced by, respectively, cathode ray tubes 26 and 27. The beams 24 and 25 are directed toward the transparencies 22 and 23 by field and relay lens assemblies 28, dichroic beam splitters 29 and objective lenses 31. After passing through the transparencies 22 and 23 the scanning beams 24 and 25 are received by photomultipliers 32 and 33 that produce on lines 34 and 35, respectively, video analog signals representing the variable detail retained by the photographs. Between the transparencies 22 and 23 and the photomultipliers 32 and 33 the scanning beams pass through lens systems including dichroic mirrors 36 and blue light filters 37.

Also reflected through the transparencies 22 and 23 by the dichroic mirrors 36 is yellow light produced by light sources 38 and 39. After being modulated by the transparencies 22 and 23, the yellow light is directed to a pair of eyepiece optical assemblies 41 and 42 by the objective lenses 31, the dichroic beam splitters 29 and a pair of mirrors 40 and 40'. The eyepiece optical assemblies 41 and 42 provide for a viewer in conventional manner a stereo presentation of the image detail retained by the transparencies 22 and 23.

A correlation system 44 receives the analog signals on lines 34 and 35 after amplification in a video amplifier 43. The correlation system 44 correlates the video signals producing on lines 45 and 46, respectively, x and y-cross-correlation signals proportional to the levels of correlatable image detail being scanned in the orthogonally related x and y-directions in the photographs 22 and 23. Also produced on line 47 is an orthogonal correlation or "raw parallax" error signal proportional to the degree of relative image detail misregistration existing between the scanned paths. The correlation system 44 does not, per se, form a part of this invention. However, circuits suitable for this application are disclosed in U. S. Pats. Nos. 2,964,644 and 3,145,303 and in U.S. application Ser. No. 839,940 of John W. Hardy et al. filed July 8, 1969.

The correlation signals on lines 45-47 are fed into an image registration and profiling control system 48 also not a part, per se, of this invention but described in detail in above noted U.S. application Ser. No. 839,940. The control system 48 produces on lines 51 and 52, respectively, x-parallax error and traversing velocity control signals that are applied to the image transformation system 21. Also produced are deflection control signals that are applied on lines 58 and 59 to deflection coils of cathode ray tube 26 and on lines 61 and 62 to deflection coils of cathode ray tube 27.

Generated in the image transformation system 21 on line 50 is a profiling speed indicating signal that is amplified in an amplifier 53 and then combined with the deflection signals on lines 58 and 61. Also supplied by the image transformation system 21 are x- and y-coordinate position indicating signals on lines 54 and 55, respectively, and a measured elevation signal on line 56. The signals on lines 54-56 are all applied to a conventional recorder 57 that records their information content in graphic form.

Shown in FIG. 2 is a schematic perspective view of the dual image transformation system 21 shown in FIG. 1. The transformation system 21 provides controlled movement of the photographic transparencies 22 and 23 in orthogonally related x-and y-coordinate directions. A y-carriage 67 is mounted on rollers 68 for movement along parallel y-tracks 69 supported by a frame 71. Similarly, an x-carriage 72 is mounted on rollers 73 for movement along x-tracks 74 supported by the y-carriage 67. Movement of the y-carriage 67 is produced by rotation of a y-lead screw 75 that engages the internally threaded collar 76. Rotation of the lead screw 75 is controlled by a y-servo motor 77 energized by the velocity control signal on line 52. Similarly, movement of the x-carriage 72 along tracks 74 is produced by rotation of an x-lead screw 78 also driven by a suitable x-servo motor 80.

A z-carriage 81 is mounted for vertical movement on z-lead screws 82 supported by the x-carriage 72. Controlled vertical movement of the z-carriage 81 is produced by a parallax correcting z-servo motor 83 energized by the x-parallax error signal on line 51 and coupled to the z-lead screws 82 by drive shaft and bevel gear assemblies 84. The photographic transparencies 22 and 23 are mounted, respectively, in photo carriages 86 and 87. Slidably engaging the photo carriages 86 and 87 and providing mechanical coupling thereof to the z-carriage 81 are space rods 88 and 89. Opposite ends of the space rods 88 and 89 terminate, respectively, in pivot connections 91 and ball joint assemblies 92 mounted on the z-carriage 81. The connections 91 and 92 permit oppositely directed arcuate movement of rods 88 and 89 in response to vertical movement of the z-carriage 81. This in turn produces relative rectilinear motion between the transparencies 22 and 23 in the x-coordinate direction defined by x-rails 74 and of a sense determined by the direction of z-carriage 81 movement. The image transformation mechanism 21 is a conventional unit marketed under the trade name Planimat by the Carl Zeiss Company, of Oberkochen, Wurttemburg, Germany. The device is also related to similar transformation systems disclosed in the above noted U.S. Pat. Nos. 2,964,644 and 3,145,303.

In response to appropriate energization of y-motor 77 the photo transparencies 22 and 23 move simultaneously with the y-carriage 67 in either a plus or minus y-coordinate direction defined by y-tracks 69. The speed and direction of movement is determined by the velocity control signal on line 52. Similarly; energization of x-lead screw 78 produces simultaneous movement of the transparencies in either a plus or minus x-direction defined by the x-tracks 74. Thus, the mechanism 21 provides selective uniform two dimensional movement of the transparencies 22 and 23 relative to their respective scanning beams 24 and 25 illustrated in FIG. 1. Conversely, vertical movement of the z-carriage 81 in response to energization of z-servo motor 83 results in relative movement between themselves as well as between the transparencies and the scanning beams 24 and 25. The z-servo motor responds to the x-parallax signal on line 51 by moving the transparencies 22 and 23 so as to align discrete image sections retaining homologous image detail with the system's optical axes. In this way image detail registration is attained in the display provided by the eyepieces 41 and 42 as well as between the image sections being scanned by the beams 24 and 25. As is well known in the map making field, the relative elevation of the z-carriage 81 required to produce this registration is directly related to the actual elevation of the terrain imaged on the sections of the stereo photos being scanned.

In typical operation, the system shown in FIGS. 1 and 2 is used to profile a stereo model represented by the stereographic transparencies 22 and 23. For example, to profile automatically in the y-coordinate direction, y-motor 77 is driven at a predetermined velocity giving rectilinear motion to y-carriage 67 and the transparencies 22 and 23 relative to the scanning beams 24 and 25. The x-motor 80 forms a part of a positioning servo, that holds the x-carriage 72 rigidly in the x-coordinate direction. The system is thereby constrained to trace out a straight profile in the y-direction and the x-position is selected by an automatic stepping system (not shown) controlled, for example, by a conventional limit switch operated when the y-carriage 67 reaches one edge of the stereo model. In response to actuation of the limit switch, the direction of rotation of y-motor 77 also would be reversed to thereby reverse the traversal direction of the y-carriage 67. Obviously, a reversal in roles of the x-and y-motors would result in the tracing of profiles in the x-direction. As a profile is being traced, the z-motor 83 continuously responds to the x-parallax error signal on line 51 by producing appropriate vertical movement of the x-carriage 81. This adjusts the relative positions of transparencies 22 and 23 in the x-direction to eliminate x-parallax and thereby provide a direct indication of terrain elevation. Simultaneously, y-parallax and other first order distortions are corrected in response to other error signals produced by the control system 48 on lines 58, 59, 61 and 62. Consequently, a viewer utilizing the eyepiece optics 41 and 42 is provided with a corrected stereo presentation of the image scene retained by the transparencies 22 and 23. The correction of y-parallax and other distortions can be achieved in various ways. However, a preferred method involves controlled relative distortion of the cathode ray tube rasters as disclosed in U.S. Pat. No. 3,432,674 of Gilbert L. Hobrough issued Mar. 11, 1969.

During a profiling operation, a y-encoder 101 (shown in FIG. 2) is driven by the y-lead screw 75 to produce an output on line 55 that identifies the position of the y-carriage 67 on track 69. Similarly, an x-encoder 102 is driven by x-lead drive screw 78 to provide on line 54 a signal identifying the position of the x-carriage 72 on track 74. The positions of the x-carriage 72 and the y-carriage 67 also establish the positions of the transparencies 22 and 23 with respect to the fixed optical axes of the lens assemblies 28 and 36. Thus, the signals on lines 54 and 55, respectively, identify x-and y-coordinate positions of points in the transparencies 22 and 23 aligned with the optical axes. A z-encoder 103 is similarly driven producing an output on line 56 proportional to the position of the z-servo motor 83. As noted above, the position of the z-servo motor required to produce registration of the scanned sections in the transparencies 22 and 23 is dependent upon the relative elevation of the actual terrain imaged thereon. Therefore, the output signal on line 56 is indicative of that elevation. The related outputs on lines 54–56 are applied to the recorder 57 (FIG. 1) which records the information providing a graphic record of terrain elevations at particular coordinate positions in the transparencies 22 and 23.

Also produced in the transformation mechanism 21 (FIG. 2) by a tachometer 104 is a y-velocity measurement signal that is applied on line 50 to the amplifier 53 shown in FIG. 1. This velocity signal is used to compensate for the inherent steady state following error of the servomechanism 83 and thereby produce temporal registration of the position identifying output signals on lines 54 and 55 with corresponding elevation indicating output signals on line 56. To more clearly describe the compensating function of the velocity indicating signal on line 50, reference is now made to FIG. 3 that schematically illustrates a stereographic display provided by the eyepieces 41 and 42 shown in FIG. 1.

Partially shown in FIG. 3, are the left transparency 22 and the right transparency 23 also shown in FIGS. 1 and 2. The solid circle 110 schematically represents an area of the left transparency 22 being displayed in the left eyepiece 41 while the solid circle 111 represents an area of the right transparency 23 being displayed in the right eyepiece 42. Similarly, the solid square 112 represents a discrete section of the left transparency 22 being scanned by the left scanning beam 24 while the solid square 113 represents a discrete section of the right transparency 23 being scanned by the right scanning beam 25. The points 114 and 115 are used to establish the well-known "floating mark" in the fused stereographic display provided for a viewer by the eyepieces 41 and 42. As schematically illustrated these points, which may comprise either cross hairs or light spots are located at the system's optical axes. FIG. 3 represents the conventional arrangement in which the scanning patterns 112 and 113 produced by the cathode ray tubes 26 and 27 are directed onto sections of the transparencies 22 and 23 concentric with those axes.

During a profiling operation, the areas 110 and 111 being displayed by the eyepieces 41 and 42 as well as the discrete image sections 112 and 113 being scanned by the scanning beams 24 and 25 are continuously changing because of the transparency movement produced by the y-and x-drive motors 77 and 80. For example, at time $t_o$ in the illustration of FIG. 3 the image areas 110 and 111 would be displayed by the viewing eyepieces 41 and 42 and the image sections 112 and 113 scanned by the scanning beams 24 and 25. However, at time $t_1$, assuming profiling movement of the transparencies 22 and 23 in the y-direction indicated by the arrow, image areas 110' and 111' would be displayed by the eyepieces 41 and 42 and dotted image sections 112' and 113' scanned by the scanning beams 24 and 25. Thus, the recorder 57 (FIG. 1) is continuously and simultaneously recording both the coordinate positions of the sequential points along the profiling path identified by the encoder outputs on lines 54 and 55 and the terrain elevation information constituted by the z-encoder 103 output signal on line 56.

Because of the profiling action and the inherent steady state following error of the z-servomechanism 83, the arrangement illustrated in FIG. 3 will normally introduce errors in the dynamic readout of the recorder 57. For example, the x- and y-encoders 102 and 101 are instantaneously responsive to movement of the transparencies 22 and 23 and therefore provide output signals at time $t_o$ that identify the coordinate positions of the image areas 110 and 111 (FIG. 3) being currently displayed which correspond to the positions of the image sections 112 and 113 being currently scanned. The z-servomechanism 83, however, responds to the image detail information extracted from the scanned image sections 112 and 113 only after a given time period determined by its inherent steady state following error. Thus, the output of z-encoder 103 on line 56 at time $t_0$ corresponds to image detail information previously extracted from image sections not exactly coincident with the image sections 112 and 113. Consequently, the terrain elevation indicated by the output signal on line 56 does not correspond exactly to the coordinate position in the transparencies 22 and 23 simultaneously identified by the position indicating signals on output lines 54 and 55.

FIG. 4 schematically illustrates the manner in which the present invention eliminates the above described dynamic output error. For reasons of simplicity there is illustrated in FIG. 4 only the left transparency 22 since as the illustration of FIG. 3 exactly analogous operations occur in the right transparency 23. As shown in FIG. 4, the center 121 of image section 122 being scanned is displaced at a distance d from the center 123 of an image area 124 being displayed. As above, the displayed area 124 is determined by the system's left optical axis and its center 123 is coincident with both the "floating mark" and the coordinate position in the left transparency 22 being identified by the x-and y- encoders 102 and 101. The displacement of image section 122 is in the direction of movement experienced by the system's information extraction mechanism relative to the transparency 22 which direction is, of course, opposite to the actual movement of the transparency 22 indicated by the arrow. As described above, its inherent steady state following error prevents the z-servo motor 83 from responding instantaneously to the image detail information being extracted from image section 122 and represented by the x-parallax error signal on input line 51. For this reason, the position of the z-servo motor 83 indicated by the z-encoder 103 at an assumed time $T_0$ corresponds to image detail information previously extracted from an image section 125 at some time $T_{-1}$. Assuming an appropriate magnitude of displacement $d$, the center of image section 125 scanned at time $T_{-1}$ will be coincident with the center 123 of the image area 124 displaced at time $T_0$. Thus, the position of the z-servo motor 83 indicated by the z-encoder output on line 56 will correspond to image detail information extracted from previously scanned image section 125 whose coordinate position is simultaneously being identified by outputs of the y-and x-encoders 101 and 102 on output lines 55 and 54. Under these conditions, the displacement between the scanned image section 122 and the viewed and position identified image area 124 exactly compensates for the inherent steady state following error of the z-servomechanism 83 and the recorder 57 records compatible elevation and position data.

The above explanation assumed a scanning pattern displacement that would exactly compensate for the inherent steady state following error of the servomechanism 83. It will be obvious, however, that the actual displacement required is dependent upon both the velocity and sense of the y-direction movement being experienced by the transparencies 22 and 23. For example, assuming a sense of y-direction profiling movement opposite to that indicated by the arrow in FIG. 4, the servo-error compensation also requires an opposite sense of scanning pattern displacement. This is illustrated in FIG. 5, wherein at time $T_0$ the center 130 of scanned image section 131 is displaced from the center 132 of displayed image area 134 in a direction opposite to the arrow indicated direction of movement being experienced by left transparency 22. Again, the direction of actual transparency movement is opposite to the direction of relative movement being experienced by the system's information extraction mechanism comprising the scanning beams 24 and 25. Assume further that the y-carriage 67 velocity in the FIG. 5 illustration is greater than that assumed for FIG. 4. That being the case, a greater magnitude of y-carriage 67 movement will occur during the constant following error period of the servomechanism 83. Thus, a larger scanning pattern displacement D will be required to compensate for servo-error and establish at time $T_0$ a z-servomechanism 83 position corresponding to a previously scanned section 133 concentric with viewed image area center 132.

According to the present invention, optimum readout accuracy is provided by employing an image section displacement having a magnitude dependent upon profiling velocity. This is accomplished by utilizing the y-tachometer 104 (FIG. 2) that produces online 50 a signal dependent upon both the value and sense of transport carriage movement in the y-direction. After amplification in the amplifier 53, the y-velocity dependent signal is added to the y-deflection signals on lines 58 and 61. The result is to induce in the cathode ray tubes 26 and 27 a uniform y-direction scanning pattern deflection having a sense and value proportional to the velocity of the y-carriage 67. Thus, a variable scanning pattern deflection is produced that accurately compensates for the steady state following error of the z-servomechanism 83 regardless of variations in profiling direction and speed.

More fitting y-traversal velocity control is also made possible by utilizing advanced scanning patterns according to the invention. As disclosed in above noted U. S. application Ser. No. 839,940, the image detail information extracted by the scanning beams can be used desirably to control y-traversal velocity of the stereo model. For example, velocity is increased in image areas of good correlation and decreased in areas of poor correlation. However, the y-servo motor 77 producing y-traversal also exhibits a steady state following error for which compensation is achieved with the advanced scanning patterns. By extracting image detail information in advance of the position identified "floating mark," required velocity changes are anticipated and more timely velocity control provided.

Obviously, many modifications and variations of the present invention are possible in light of the above teachings. It is to be understood, therefore, that the invention can be practiced otherwise than as specifically described.

What is claimed: is:

1. Automatic stereoplotting apparatus comprising:
   frame means for retaining a pair of stereographic images;
   extraction means for extracting image detail information retained by discrete sections in said pair of stereographic images;
   correlation means responsive to said image detail information for producing a parallax error signal,
   parallax correcting servomechanism means operatively associated with said stereographic images and adapted to select said discrete sections from which information is extracted, said servomechanism means being controlled by said parallax error signal so as to select discrete sections retaining registerable image detail;
   drive means for producing uniform relative movement between both of said stereographic images and said extraction means so as to continuously and simultaneously change in each of said images, said sections from which information is extracted;
   identification means responsive to said drive means to provide an output that identifies in said images the positions of said discrete sections from which information is extracted;
   position indication means responsive to movement of said parallax correcting servomechanism means to provide an output dependent upon the position of said servomechanism means;
   and compensating means that compensates for the inherent steady state following error of said servomechanism means thereby establishing an output from said position indicating means that always corresponds to a position of said servomechanism means produced by image detail information extracted from discrete image sections the positions of which are simultaneously identified by the output of said identification means.

2. Automatic stereoplotting apparatus according to claim 1 wherein said compensating means produces in said stereographic images a displacement in the positions of said discrete sections from which information is being extracted relative to the positions of said other discrete sections being simultaneously identified by the output of said identification means.

3. Automatic stereoplotting apparatus according to claim 2 wherein said displacement produced by said compensating means is in the direction of relative movement produced by said drive means.

4. Automatic stereoplotting apparatus according to claim 3 wherein said compensating means maintains said sections from which information is being extracted advanced with respect to said sections being identified in the direction of relative extraction means movement produced by said drive means.

5. Automatic stereoplotting apparatus according to claim 4 including velocity control means for variably controlling the velocity of said relative movement, and wherein said compensating means is adapted to vary the magnitude of said displacement dependent upon the velocity of relative movement produced by said velocity control means.

6. Automatic stereoplotting apparatus according to claim 5 wherein said extraction means comprises scanning means for directing scanning beams through said discrete sections in said pair of stereographic images, and conversion means for converting said scanning beams into electrical analog signals possessing said information.

7. Automatic stereoplotting apparatus according to claim 6 wherein said scanning means produce scanning patterns that define said sections in said pair of stereographic images.

8. Automatic stereoplotting apparatus according to claim 7 wherein said said scanning means comprise beam deflection means and said compensating means produces said displacement by applying a scanning pattern position control signal to said beam deflection means.

9. Automatic stereoplotting apparatus according to claim 8 wherein said frame means comprises an x-y carriage retaining said images and adapted to be driven in orthogonally related directions by said drive means.

10. Automatic stereoplotting apparatus according to claim 9 wherein said servomechanism selects said discrete sections by producing relative movement between said images retained by said x-y carriage.

11. Automatic image registration apparatus comprising:
frame means for retaining a pair of stereographic images;
viewing means adapted to provide a stereographic display of corresponding areas in said pair of stereographic images;
extraction means for extracting information regarding the image detail retained by discrete sections of said pair of stereographic images;
automatic image registration means comprising servomechanism means responsive to said information extracted by said extraction means, said automatic image registration means adapted to effect registration of homologous image detail in said stereographic display provided by said viewing means;
drive means for producing uniform relative movement of both of said stereographic images with respect to both said extraction means and said viewing means so as to continuously change both said corresponding areas displayed by said viewing means and said discrete sections from which information is extracted;
and variable position control means for adjustably establishing in said stereographic images the positions of said corresponding areas being displayed by said viewing means relative to the positions of said discrete sections from which information is being extracted by said extraction means.

12. Automatic image registration apparatus according to claim 11 wherein said variable position control means is adapted to maintain the centers of said corresponding areas displaced relative to the centers of said discrete sections, said displacement being in the direction of relative movement produced by said drive means.

13. Automatic image registration apparatus according to claim 12 wherein said variable position control means is adapted to maintain said centers of said corresponding areas advanced with respect to said centers of said discrete sections in the direction of relative extraction means movement produced by said drive means.

14. Automatic image registration apparatus according to claim 12 including velocity control means for variably controlling the velocity of said relative movement, and wherein said variable position control means is adapted to vary the magnitude of said displacement between the centers of said corresponding areas and the centers of said discrete sections dependent upon the velocity of relative movement produced by said velocity control means.

15. Automatic image registration apparatus according to claim 14 wherein said extraction means comprises scanning means for directing scanning beams through said discrete sections in said pair of stereographic images, and conversion means for converting said scanning beams into electrical analog signals possessing said information.

16. Automatic image registration apparatus according to claim 15 wherein said scanning means produce scanning patterns that define said sections in said pair of stereographic images.

17. Automatic image registration apparatus according to claim 16 wherein said scanning means comprise beam deflection means and said position control means produces said displacement by applying a scanning pattern position control signal to said beam deflection means.

18. Automatic image registration apparatus according to claim 17 wherein said frame means comprises an x-y carriage retaining said images and adapted to be driven in orthogonally related directions by said drive means.

19. Automatic image registration apparatus according to claim 18 wherein said servomechanism selects said discrete sections by producing relative movement between said images retained by said x-y carriage.

20. Automatic image registration apparatus according to claim 13 wherein said position control means compensates for the inherent steady state following error of said servomechanism means so that said servomechanism means is instantaneously effective to register given pairs of said corresponding areas in response to image detail information extracted from discrete sections the centers of which are coincident with the centers of said given pairs of corresponding areas.

21. Automatic image registration apparatus according to claim 20 including velocity control means for variably controlling the velocity of said relative movement, and wherein said variable position control means is adapted to vary the magnitude of said displacement between the centers of said corresponding areas and the centers of said discrete sections dependent upon the velocity of relative movement produced by said velocity control means.

* * * * *